(12) United States Patent
Ellers

(10) Patent No.: US 11,263,882 B2
(45) Date of Patent: Mar. 1, 2022

(54) INTERNAL POWER GENERATING CIRCUIT FOR EAS HARD TAGS

(71) Applicant: Sensormatic Electronics, LLC, Boca Raton, FL (US)

(72) Inventor: Edward Paul Ellers, Boca Raton, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 16/894,326

(22) Filed: Jun. 5, 2020

(65) Prior Publication Data

US 2021/0097833 A1  Apr. 1, 2021

Related U.S. Application Data

(60) Provisional application No. 62/908,268, filed on Sep. 30, 2019.

(51) Int. Cl.
| | | |
|---|---|---|
| *G08B 13/24* | (2006.01) | |
| *H02N 2/00* | (2006.01) | |
| *H02J 7/34* | (2006.01) | |
| *H02N 2/18* | (2006.01) | |
| *E05B 73/00* | (2006.01) | |
| *E05B 47/06* | (2006.01) | |
| *E05B 47/00* | (2006.01) | |

(52) U.S. Cl.
CPC ...... *G08B 13/2431* (2013.01); *E05B 73/0017* (2013.01); *G08B 13/246* (2013.01); *H02J 7/345* (2013.01); *H02N 2/0005* (2013.01); *H02N 2/18* (2013.01); *E05B 47/0607* (2013.01); *E05B 2047/0095* (2013.01)

(58) Field of Classification Search
CPC ........ E05B 73/0017; E05B 2047/0095; H02N 2/18; H02J 7/345; G08B 13/2402; G08B 13/2405; G08B 13/2411; G08B 13/242; B81B 3/0021
See application file for complete search history.

(56) References Cited

U.S. PATENT DOCUMENTS

| | | | | |
|---|---|---|---|---|
| 5,739,514 A | * | 4/1998 | Uchida | .............. G08B 13/2477 235/375 |
| 6,700,310 B2 | * | 3/2004 | Maue | ..................... B60R 25/24 310/319 |
| 9,201,412 B2 | * | 12/2015 | Posa | ..................... G05B 15/02 |
| 2007/0040655 A1 | * | 2/2007 | Lee | .................... G06K 19/0707 340/10.1 |
| 2009/0027167 A1 | * | 1/2009 | Pistor | .................. H04B 1/1607 340/10.1 |
| 2009/0219139 A1 | * | 9/2009 | Slesinski | ............. H04B 1/1607 340/10.1 |
| 2016/0260303 A1 | * | 9/2016 | Strulovitch | ......... E05B 73/0017 |

(Continued)

*Primary Examiner* — Andrew W Bee
(74) *Attorney, Agent, or Firm* — Arent Fox, LLP

(57) ABSTRACT

In an aspect, the present disclosure includes a method, apparatus, and system for operating a security tag, comprising activating a piezo-electric component of the security tag to generate an electrical charge in response to an applied mechanical force on the security tag; determining whether a verification signal has been received by the security tag upon activating the piezo-electric component; and disengaging a mechanical component of the security tag based on a determination that the verification signal has been received.

20 Claims, 9 Drawing Sheets

(56) References Cited

U.S. PATENT DOCUMENTS

2016/0364969 A1* 12/2016 Casanova ........... E05B 73/0047
2017/0046933 A1*  2/2017 Stewart ............... E05B 73/0017
2017/0287297 A1* 10/2017 Hardie-Bick ...... G06Q 20/3278
2018/0334836 A1* 11/2018 Miller ................. E05B 73/0052

* cited by examiner

INTERNAL POWER GENERATING CIRCUIT FOR EAS HARD TAGS

CROSS-REFERENCE TO RELATED APPLICATION(S)

The present application claims benefit of U.S. Provisional Application No. 62/908,268 entitled "INTERNAL POWER GENERATING CIRCUIT FOR EAS HARD TAGS" filed Sep. 30, 2019, and is assigned to the assignee hereof and hereby expressly incorporated by reference herein.

BACKGROUND

Technical Field

This document relates generally to security tags used in Electronic Article Surveillance ("EAS") systems. More particularly, this document relates to security tags and an internal power generating circuit for security tags.

Introduction

A typical EAS system in a retail setting may comprise a monitoring system and at least one security tag or marker attached to an article to be protected from unauthorized removal. The monitoring system establishes a surveillance zone in which the presence of security tags and/or markers can be detected. The surveillance zone is usually established at an access point for the controlled area (e.g., adjacent to a retail store entrance and/or exit). If an article enters the surveillance zone with an active security tag and/or marker, then an alarm may be triggered to indicate possible unauthorized removal thereof from the controlled area. In contrast, if an article is authorized for removal from the controlled area, then the security tag and/or marker thereof can be detached therefrom. Consequently, the article can be carried through the surveillance zone without being detected by the monitoring system and/or without triggering the alarm.

Radio Frequency Identification ("RFID") systems may also be used in a retail setting for inventory management and related security applications. In an RFID system, a reader transmits a Radio Frequency ("RF") carrier signal to an RFID device. The RFID device responds to the carrier signal with a data signal encoded with information stored by the RFID device. Increasingly, passive RFID labels are used in combination with EAS labels in retail applications.

As is known in the art, security tags for security and/or inventory systems can be constructed in any number of configurations. The desired configuration of the security tag is often dictated by the nature of the article to be protected. For example, EAS and/or RFID labels may be enclosed in a rigid tag housing, which can be secured to the monitored object (e.g., a piece of clothing in a retail store). The rigid housing typically includes a moveable pin which is inserted through the fabric and secured in place on the opposite side by a mechanism disposed within the rigid housing. The housing cannot be removed from the clothing without destroying the housing except by using a dedicated removal device.

A typical retail sales transaction occurs at a fixed Point Of Sale ("POS") station manned by a store sales associate. The store sales associate assists a customer with the checkout process by receiving payment for an item. If the item is associated with an EAS/RFID element, the store sales associate uses the dedicated removal device to remove the security tag from the purchased item.

A retail sales transaction can alternatively be performed using a mobile POS unit. Currently, there is no convenient way to detach a security tag using a mobile POS unit. Options include: the use of a mobile detacher unit in addition to a mobile POS unit; the use of a fixed detacher unit located within the retail store which reduces the mobility of the mobile POS unit; or the use of a fixed detacher unit located at an exit of a retail store which burdens customers with a post-POS task. None of these options is satisfactory for large scale mobile POS adaption in a retail industry.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method, apparatus, and system for operating a security tag, comprising activating a piezo-electric component of the security tag to generate an electrical charge in response to an applied mechanical force on the security tag; determining whether a verification signal has been received by the security tag upon activating the piezo-electric component; and disengaging a mechanical component of the security tag based on a determination that the verification signal has been received.

In a further example, an apparatus for wireless communication is provided that includes a transceiver, a memory configured to store instructions, and one or more processors communicatively coupled with the transceiver and the memory. The one or more processors are configured to execute the instructions to activate a piezo-electric component of a security tag to generate an electrical charge in response to an applied mechanical force on the security tag; determine whether a verification signal has been received by the security tag upon activating the piezo-electric component; and disengage a mechanical component of the security tag based on a determination that the verification signal has been received.

In another aspect, an apparatus for wireless communication is provided that includes means for activating a piezo-electric component of a security tag to generate an electrical charge in response to an applied mechanical force on the security tag; means for determining whether a verification signal has been received by the security tag upon activating the piezo-electric component; and means for disengaging a mechanical component of the security tag based on a determination that the verification signal has been received.

In yet another aspect, a non-transitory computer-readable medium is provided including code executable by one or more processors to activate a piezo-electric component of a security tag to generate an electrical charge in response to an applied mechanical force on the security tag; determine whether a verification signal has been received by the security tag upon activating the piezo-electric component; and disengage a mechanical component of the security tag based on a determination that the verification signal has been received.

In another aspect, a security tag comprises a piezo-electric component that generates an electrical charge in response to being activated based on an applied mechanical force; a communicating component that determines whether a verification signal has been received by the security tag upon activating the piezo-electric component; and a mechanical component that disengages the security tag based on a determination that the verification signal has been received.

In another aspect, an electronic article surveillance (EAS) system comprises a network device communicating a verification signal to a security tag attached to an article when a successful purchase of the article has been verified, where the verification signal includes a detach command for initiating a detachment of the security tag from the article; and the security tag comprising a piezo-electric component that generates an electrical charge in response to being activated based on an applied mechanical force; a communicating component that determines whether a verification signal has been received by the security tag from the network device upon activating the piezo-electric component; and a mechanical component that is caused to be released in response to a reception of the wireless signal at the security tag.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
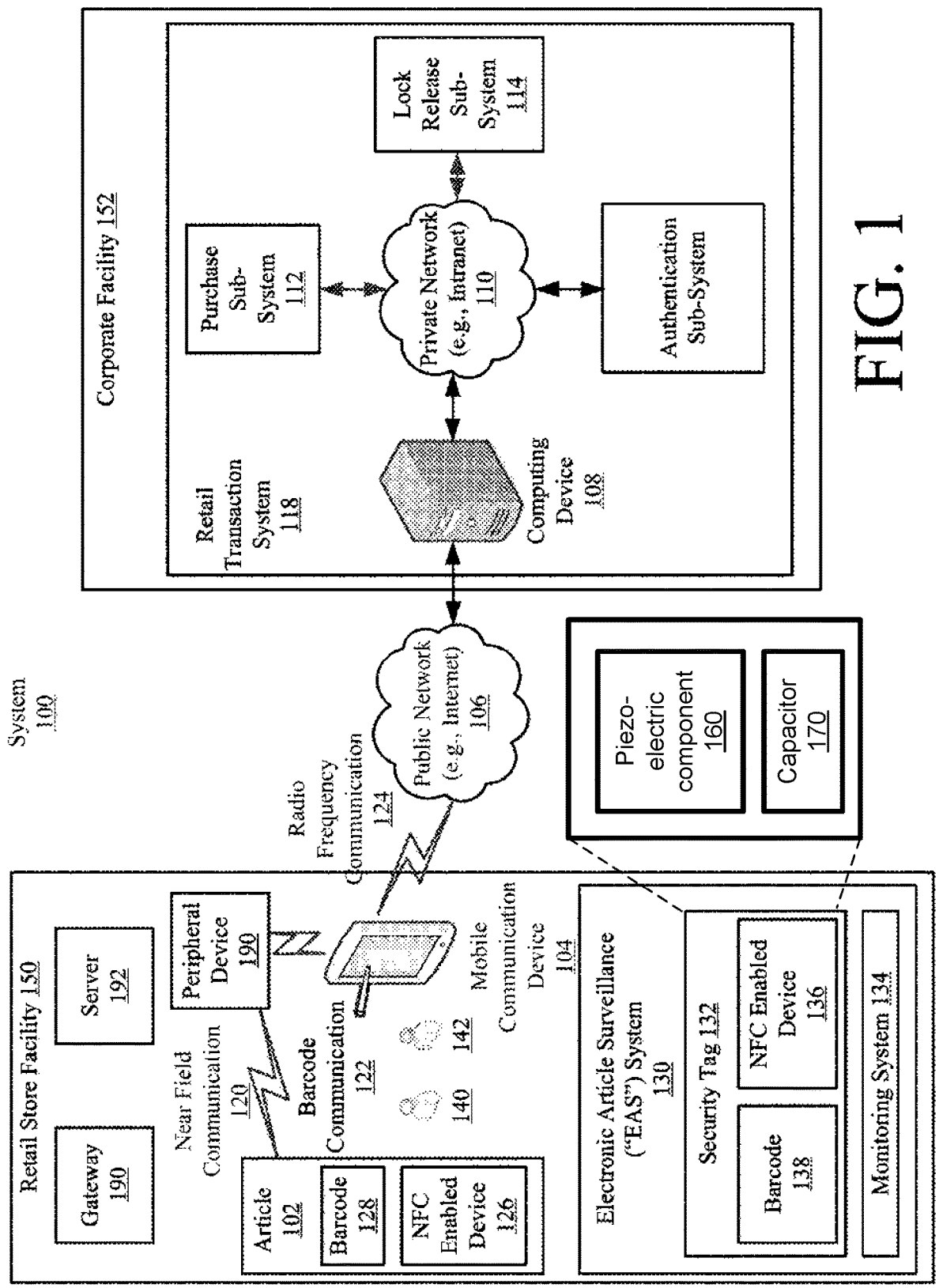
FIG. 1 is a schematic illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

This disclosure deals broadly with anti-theft devices featuring Acousto-Magnetic ("AM") and/or RFID technology, advanced security tags equipped with visual and audible alarms, and audio/visual alarms incorporated into the AM/RFID pedestals at the stores' entrance/exit. Deactivatable security tags (e.g., of an AM type) can be deactivated at a POS by a cashier or by placing goods in designated areas during a self-check-out process. In current retail practices generally employed, anti-theft devices (which are equipped with an RFID element, an AM element or both types of elements incorporated into hard tags) require customers to bring their merchandise to the POS at which time the cashier (a) completes the transaction and (b) deactivates and/or removes the anti-theft devices from the sold items. Customers can wait in lines for long periods of time before the next cashier is available. This solution can result in customer dissatisfaction, and thus could result in the loss of return business. Furthermore, sometimes cashiers forget to remove/deactivate anti-theft devices. This lapse leads to false alarms at the store's exit, customer embarrassment and wasted time.

Therefore, the present disclosure more specifically concerns a self-detaching solution for security tags. The self-detaching solution allows a customer to select a desired item (e.g., a piece of clothing), scan the desired item using a mobile point of sale (MPOS) device (e.g., a smart phone and/or tablet running a purchase transaction software application), and make a secure payment of the desired item using a purchase transaction software application running on the MPOS device (e.g., using PayPal® or other cloud based online service). Once a purchase transaction has been verified by a retail store system, a wireless command signal is sent from the retail store system to the security tag. In response to the wireless command signal, one or both of the following events occurs: a mechanical component (e.g., a solenoid and/or a gear motor) is actuated so that removal of the security tag from the purchased item is possible by the customer. For example, actuation of the mechanical component causes a captive pin to be released, whereby the security tag can be removed from the item. The captive pin is fixedly coupled with the security tag's housing such that there is no potential loss or theft thereof by the customer, or need to use two hands to couple/decouple the security tag from an item. This captive pin arrangement also ensures that the security tag is safe with no sharp object exposed to either customers during their shopping experience or store personnel during their routine maintenance (e.g., handling of the security tags).

Notably, the self-detaching solution is compatible with existing AM detection systems and RFID enabled inventory tracking systems. Also, a store associate is not required or needed for removing the security tag from the item. Additionally, the self-detaching solution facilities mobile point of sale applications because the need for a dedicated detacher device (i.e., one in which the security tag must be disposed for detaching the same from an item) has been eliminated.

Conventional solutions do not provide a frictionless customer experience in a retail environment because all require physical intervention of a store employee. Some conventional solutions do eliminate the hard tag by replacing it with an embedded and deactivatable tag which allows customers to use a self-checkout option. However, these conventional solutions lack the visual effect of an anti-theft hard tag. The present self-detaching security tag solution makes it inconvenient to steal, while still convenient to buy protected items.

The present self-detaching security tag solution localizes the entire checkout process, so a customer may purchase protected goods without any interaction with a cashier. The customer can now try on an article of clothing, choose to purchase during the trying-on experience and with an approved method of payment purchase the merchandise. Once the transaction is complete, the anti-theft device is removed or deactivated automatically allowing them to walk out of the retail environment without the pedestal alarming.

The principle of frictionless customer experience is the core of the present self-detaching security tag solution. Comparing a convenient customer purchase experience within a retail environment, to something as easy as buying a can of soda from a vending machine. This solution expedites the check-out process as well as reducing required manpower by facilitating the usage of a customer's smart device (e.g., a phone, tablet, watch or glasses), local and cloud based servers, smart and wireless anti-theft hard tags, and a third party payment vendor.

In some scenarios, the present solution utilizes a smart device retailer's application to enable scanning of uniquely identified anti-theft devices that are individually connected to goods to be purchased. Scanning goods can be performed by either visual mechanisms (camera scanning quick response (QR) code for instance) or RF mechanisms (phone scans Bluetooth low energy (BLE) beacon or near-field communication (NFC) wirelessly). The anti-theft devices comprise wireless self-detaching anti-theft tags. The wireless self-detaching anti-theft tags will be described in detail below.

To support a variety of use cases and enhance security, the wireless self-detaching security tags employed herein may combine different technologies. For example, the wireless self-detaching security tags may: (1) combine barcode technology, Bluetooth® Low Energy technology ("BLE"), and NFC technology in order to support a software based "add to cart" functionality in scenarios where a mobile communication device (e.g., a smart phone) lacks one or more of these features; (2) have embedded RFID, AM and BLE technologies to enhance functionality thereof when AM and RFID devices are passive devices and can only detect shoplifting at a point of entrance/exit of a RSF; and (3) combine BLE and 802.15.4 technologies to bring higher security to a wireless link. In scenario (3), the BLE technology can serve as the main form of communications between customer's mobile communication devices and self-detaching security tags for identification purposes, while the 802.15.4 technology can serve as a proprietary wireless local network (which can include multiple types of different wireless nodes in addition to the self-detaching security tags) to submit the release-tag command over a secured wireless channel.

Exemplary Systems for Customer Detachment of Security Tags

The present disclosure generally relates to systems and methods for operating a security tag of an EAS system. The methods involve, receiving a request to detach a security tag from an article; generating a signal including a command for actuating a detachment mechanism of the security tag; and wirelessly communicating the signal to the security tag for causing the actuation of the detachment mechanism. The detachment mechanism can include, but is not limited to, an electro-mechanical detachment mechanism. Operations of the electro-mechanical detachment mechanism will be described in detail below. The mechanical detachment portion of the electro-mechanical detachment mechanism may include, but is not limited to, a pin.

Referring now to FIG. 1, there is provided a schematic illustration of an exemplary system 100 that is useful for understanding the present invention. System 100 is generally configured to allow a customer to purchase an article 102 using a Mobile Communication Device ("MCD") 104 and an optional Peripheral Device ("PD") 190 thereof. PD 190 is designed to be mechanically attached to the MCD 104. In some scenarios. PD 190 wraps around at least a portion of MCD 104. Communications between MCD 104 and The PD 190 are achieved using a wireless Short Rage Communication ("SRC") technology, such as a Bluetooth technology. The PD 190 also employs other wireless SRC technologies to facilitate the purchase of article 102. The other wireless SRC technologies can include, but are not limited to, Near Field Communication ("NFC") technology, InfRared ("IR") technology, Wireless Fidelity ("Wi-Fi")

technology, Radio Frequency Identification ("RFID") technology, and/or ZigBee technology. PD 190 may also employ barcode technology, electronic card reader technology, and Wireless Sensor Network ("WSN") communications technology.

As shown in FIG. 1, system 100 comprises a retail store facility 150 including an EAS 130. The EAS 130 comprises a monitoring system 134 and at least one security tag 132. Although not shown in FIG. 1, the security tag 132 is attached to article 102, thereby protecting the article 102 from an unauthorized removal from the retail store facility 150. The monitoring system 134 establishes a surveillance zone (not shown) within which the presence of the security tag 132 can be detected. The surveillance zone is established at an access point (not shown) for the retail store facility 150. If the security tag 132 is carried into the surveillance zone, then an alarm is triggered to indicate a possible unauthorized removal of article 102 from the retail store facility 150.

During store hours, a customer 140 may desire to purchase the article 102. The customer 140 can purchase the article 102 without using a traditional fixed POS station (e.g., a checkout counter). Instead, the purchase transaction can be achieved using MCD 104 and/or PD 190. MCD 104 (e.g., a mobile phone or tablet computer) can be in the possession of the customer 140 or store associate 142 at the time of the purchase transaction. Notably. MCD 104 has a retail transaction application installed thereon that is configured to facilitate the purchase of an article 102 and the management/control of PD 190 operations for an attachment/detachment of the security tag 132 to/from article 102. The retail transaction application can be a pre-installed application, an add-on application or a plug-in application.

In order to initiate a purchase transaction, the retail transaction application is launched via a user-software interaction. The retail transaction application facilitates the exchange of data between the article 102, security tag 132, customer 140, store associate 142, and/or Retail Transaction System ("RTS") 118. For example, after the retail transaction application is launched, a user 140, 142 is prompted to start a retail transaction process for purchasing the article 102. The retail transaction process can be started simply by performing a user software interaction, such as depressing a key on a keypad of the MCD 104 or touching a button on a touch screen display of the MCD 104.

Subsequently, the user 140, 142 may manually input into the retail transaction application article information. Alternatively or additionally, the user 140, 142 places the MCD 104 in proximity of article 102. As a result of this placement, the MCD 104 and/or PD 190 obtains article information from the article 102. The article information includes any information that is useful for purchasing the article 102, such as an article identifier and an article purchase price. In some scenarios, the article information may even include an identifier of the security tag 132 attached thereto. The article information can be communicated from the article 102 to the MCD 104 and/or PD 190 via a short range communication, such as a barcode communication 122 or an NFC 120. In the barcode scenario, the article 102 has a barcode 128 attached to an exposed surface thereof. In the NFC scenarios, the article 102 may comprise an NFC enabled device 126. If the PD 190 obtains the article information, then the PD 190 forwards the article information to the MCD 104 via a wireless SRC, such as a Bluetooth communication.

Thereafter, payment information is input into the retail transaction application of MCD 104 by the user 140, 142. Upon obtaining the payment information, the MCD 104 automatically performs operations for establishing a retail transaction session with the RTS 118. The retail transaction session can involve communicating the article information and payment information from the MCD 104 to the RTS 118 via an RF communication 124 and/or public network 106 (e.g., the Internet); completing a purchase transaction by the RTS 118, and communicating a response message from the RTS 118 to MCD 104 indicating that the article 102 has been successfully or unsuccessfully purchased. The purchase transaction can involve using an authorized payment system, such as a bank Automatic Clearing House ("ACH") payment system, a credit/debit card authorization system, or a third party system (e.g., PayPal®, SolidTrust Pay® or Google Wallet®).

The purchase transaction can be completed by the RTS 118 using the article information and payment information. In this regard, such information may be received by a computing device 108 of the RTS 118 and forwarded thereby to a sub-system of a private network 100 (e.g., an Intranet). For example, the article information and purchase information can also be forwarded to and processed by a purchase sub-system 112 to complete a purchase transaction. When the purchase transaction is completed, a message is generated and sent to the MCD 104 indicating whether the article 102 has been successfully or unsuccessfully purchased.

If the article 102 has been successfully purchased, then a security tag detaching process can be started automatically by the RTS 118 or by the MCD 104. Alternatively, the user 140, 142 can start the security tag detaching process by performing a user-software interaction using the MCD 104. In all three scenarios, the article information can optionally be forwarded to and processed by a lock release sub-system 114 to retrieve a detachment key or a detachment code that is useful for detaching the security tag 132 from the article 102. The detachment key or code is then sent from the RTS 118 to the MCD 104 such that the MCD 104 can perform or cause the PD 190 to perform the security tag detachment operations. The tag detachment operations are generally configured to cause the security tag 132 to actuate a detaching mechanism (not shown in FIG. 1). In this regard, the MCD 104 or PD 190 generates a detach command and sends a wireless detach signal including the detach command to the security tag 132. The security tag 132 authenticates the detach command and activates the detaching mechanism. For example, the detach command causes a pin to be retracted such that the security tag can be removed from the article 102. Once the security tag 132 has been removed from article 102, the customer 140 can carry the article 102 through the surveillance zone without setting off the alarm.

Figure 2:
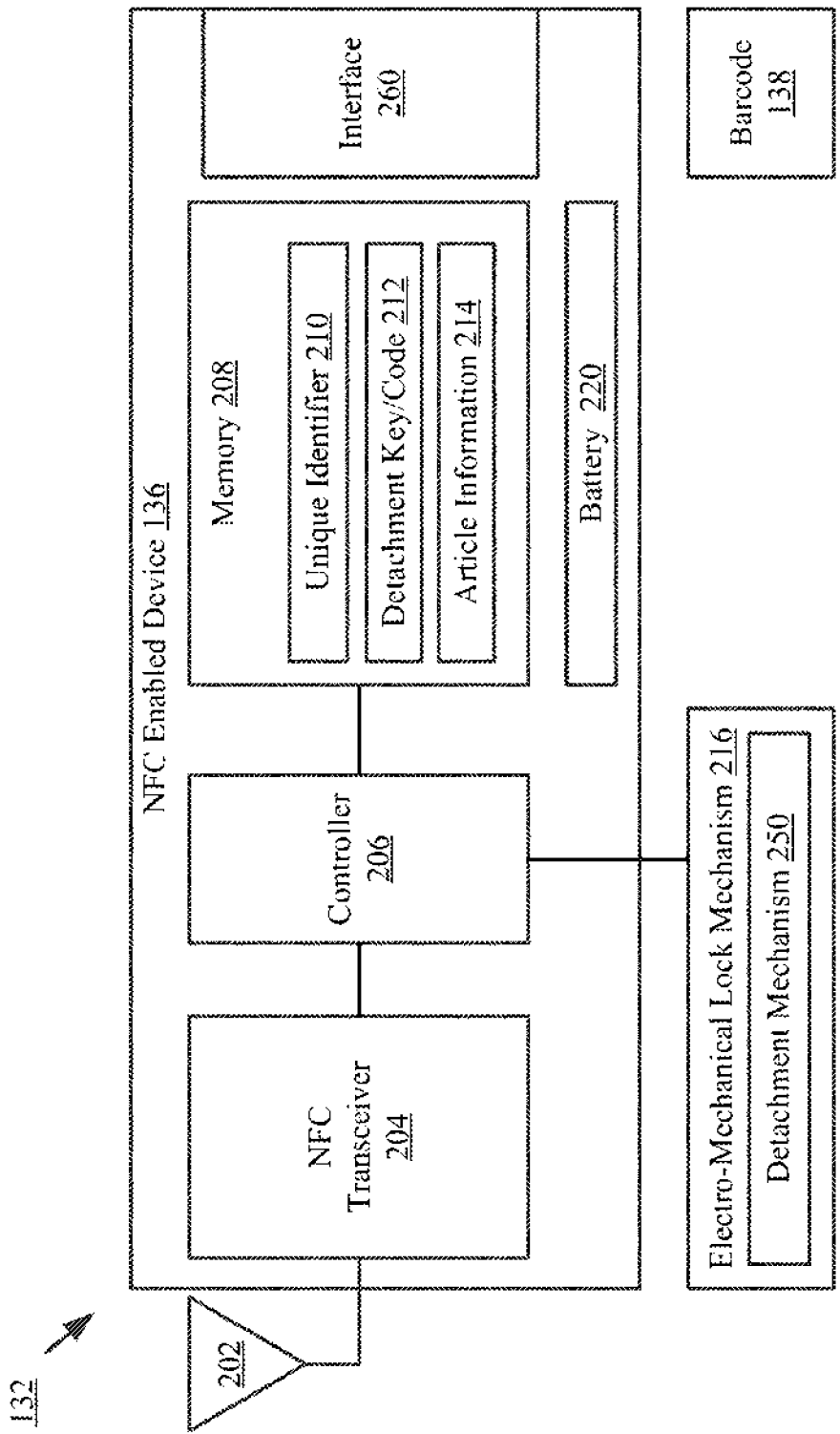
FIG. 2 is a block diagram of an exemplary architecture for a security tag shown in FIG. 1.
Figure 3:
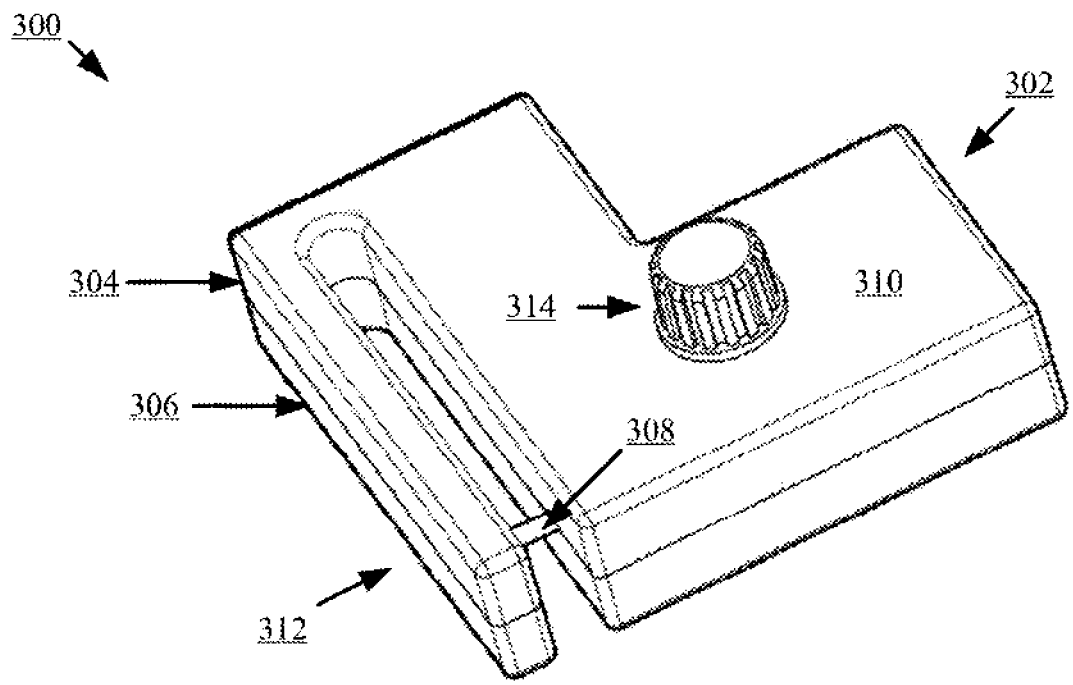
FIG. 3 is a front perspective view of an exemplary security tag.
Figure 4:
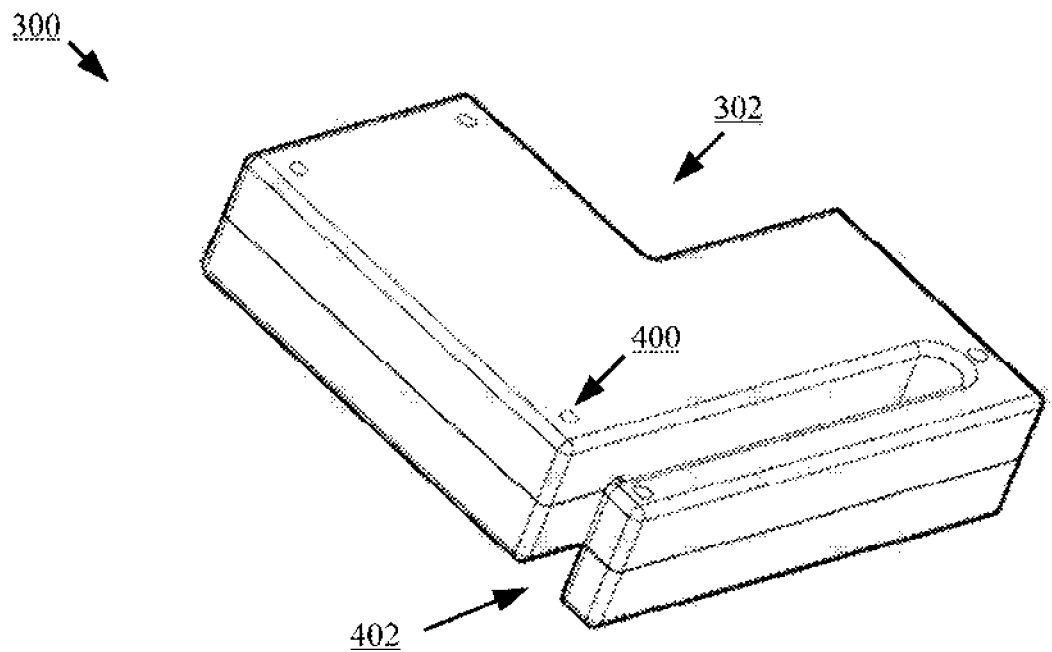
FIG. 4 is a back perspective view of the security tag shown in FIG. 3.
Figures 5, 6, 7:
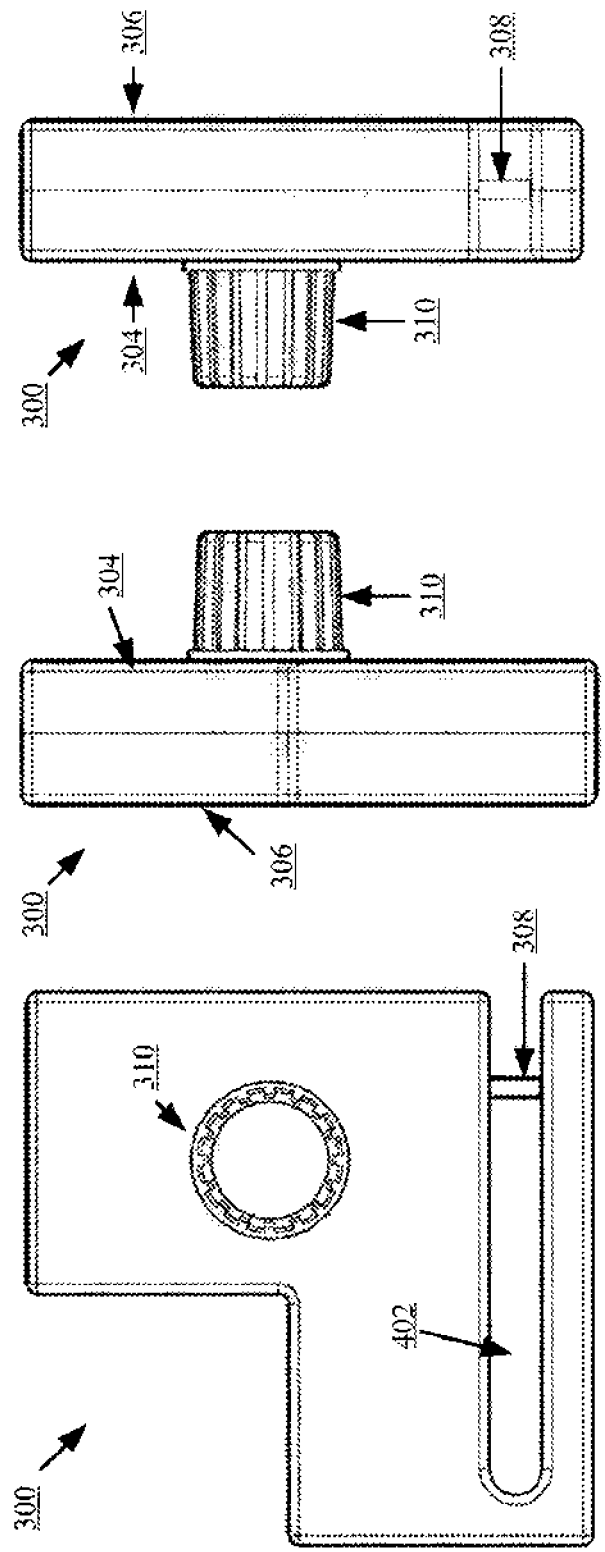
FIG. 5 is a top view of the security tag shown in FIGS. 3-4.
FIG. 6 is a right side view of the security tag shown in FIGS. 3-5.
FIG. 7 is a left side view of the security tag shown in FIGS. 3-6.
Figure 8:
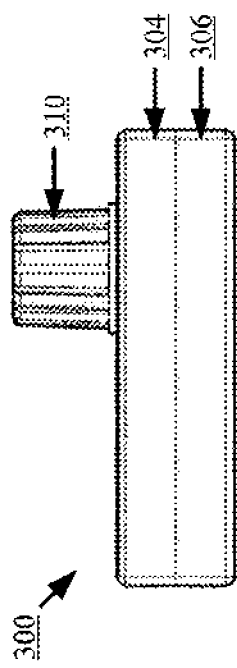
FIG. 8 is a bottom view of the security tag shown in FIGS. 3-7.

Referring now to FIG. 2, there is provided a schematic illustration of an exemplary architecture for a security tag 132. The security tag 132 can include more or less components than shown in FIG. 2. However, the components shown are sufficient to disclose an illustrative embodiment implementing the present invention. Some or all of the components of the security tag 132 can be implemented in hardware, software and/or a combination of hardware and software. The hardware includes, but is not limited to, one or more electronic circuits.

The hardware architecture of FIG. 2 represents an embodiment of a representative security tag 132 configured to facilitate the prevention of an unauthorized removal of an article (e.g., article 102 of FIG. 1) from a retail store facility (e.g., retail store facility 150 of FIG. 1). In this regard, the security tag 132 may have a barcode 138 affixed thereto for allowing data to be exchanged with an external device (e.g., PD 190 of FIG. 1) via barcode technology.

The security tag 132 also comprises an antenna 202 and an NFC enabled device 136 for allowing data to be exchanged with the external device via NFC technology. The antenna 202 is configured to receive NFC signals from the external device and transmit NFC signals generated by the NFC enabled device 136. The NFC enabled device 136 comprises an NFC transceiver 204. NFC transceivers are well known in the art, and therefore will not be described herein. However, it should be understood that the NFC transceiver 204 processes received NFC signals to extract information therein. This information can include, but is not limited to, a request for certain information (e.g., a unique identifier 210), and/or a message including information specifying a detachment key or code for detaching the security tag 132 from an article. The NFC transceiver 204 may pass the extracted information to the controller 206.

If the extracted information includes a request for certain information, then the controller 206 may perform operations to retrieve a unique identifier 210 and/or article information 214 from memory 208. The article information 214 can include a unique identifier of an article and/or a purchase price of the article. The retrieved information is then sent from the security tag 132 to a requesting external device (e.g., PD 190 of FIG. 1) via an NFC communication.

In contrast, if the extracted information includes information specifying a one-time-only use key and/or instructions for programming the security tag 132 to actuate a detachment mechanism 250 of an electro-mechanical lock mechanism 216, then the controller 206 may perform operations to simply actuate the detachment mechanism 250 using the one-time-only key. Alternatively or additionally, the controller 206 can: parse the information from a received message; retrieve a detachment key/code 212 from memory 208; and compare the parsed information to the detachment key/code to determine if a match exists therebetween. If a match exists, then the controller 206 generates and sends a command to the electro-mechanical lock mechanism 216 for actuating the detachment mechanism 250. An auditory or visual indication can be output by the security tag 132 when the detachment mechanism 250 is actuated. If a match does not exist, then the controller 206 may generate a response message indicating that detachment key/code specified in the extracted information does not match the detachment key/code 212 stored in memory 208. The response message may then be sent from the security tag 132 to a requesting external device (e.g., PD 190 of FIG. 1) via a wireless short-range communication or a wired communication via interface 260. A message may also be communicated to another external device or network node via interface 260.

In some scenarios, the connections between components 204, 206, 208, 216, and 260 are unsecure connections or secure connections. The phrase "unsecure connection", as used herein, refers to a connection in which cryptography and/or tamper-proof measures are not employed. The phrase "secure connection", as used herein, refers to a connection in which cryptography and/or tamper-proof measures are employed. Such tamper-proof measures include enclosing the physical electrical link between two components in a tamper-proof enclosure.

Notably, the memory 208 may be a volatile memory and/or a non-volatile memory. For example, the memory 208 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 208 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The electro-mechanical lock mechanism 216 is operable to actuate the detachment mechanism 250. The detachment mechanism 250 can include a lock configured to move between a lock state and an unlock state. Such a lock can include, but is not limited to, a pin. The electro-mechanical lock mechanism 216 is shown as being indirectly coupled with NFC transceiver 204 via controller 206. The invention is not limited in this regard. The electro-mechanical lock mechanism 216 can additionally or alternatively be directly coupled with the NFC transceiver 204. One or more of the components 204, 206 can cause the lock of the detachment mechanism 250 to be transitioned between states in accordance with information received from an external device (e.g., PD 190 of FIG. 1). The components 204-208, 260 and a battery 220 may be collectively referred to herein as the NFC enabled device 136.

The NFC enabled device 136 can be incorporated into a device which also houses the electro-mechanical lock mechanism 216, or can be a separate device which is in direct or indirect communication with the electro-mechanical lock mechanism 216. The NFC enabled device 136 is coupled with a power source. The power source may include, but is not limited to, battery 220 or an A/C power connection (not shown). Alternatively or additionally, the NFC enabled device 136 is configured as a passive device which derives power from an RF signal inductively coupled thereto.

In an aspect, security tag 132 includes a piezo-electric component 160 and a capacitor. For example, a piezo-electric component 160 may be configured to generate an electrical charge in response to being activated based on an applied mechanical force; a communicating component that determines whether a verification signal has been received by the security tag 160 upon activating the piezo-electric component 160; and a mechanical component that disengages the security tag 132 based on a determination that the verification signal has been received. In an example, capacitor 170 may be configured to charge based on the electrical charge generated by activating the piezo-electric component 160 of the security tag 132.

Exemplary Security Tag Architectures

Exemplary architectures for a security tag 300 will now be described in detail in relation to FIGS. 3-12. Security tag 134 is the same as or similar to security tag 300. As such, the following discussion of security tag 300 is sufficient for understanding various features of security tag 134.

As shown in FIGS. 3-8, the security tag 300 comprises a hard EAS tag formed of a molded plastic enclosure 302. An EAS and/or RFID element (not shown in FIGS. 3-12) may be housed within the enclosure 302. The enclosure 302 is defined by first and second housing portions 304, 306 that are securely coupled with each other (e.g., via an adhesive, an ultrasonic weld and/or mechanical couplers 400 such as screws).

The enclosure 302 has an insert space 402 sized and shaped for receiving at least a portion of an article (e.g., article 102 of FIG. 1) so that the security tag 300 can be securely attached or coupled thereto. The security tag 300 is securely coupled with the article by transitioning a pin 308 from an unengaged state shown in FIG. 9 to an engaged state shown in FIGS. 3-9 and 11. The transitioning is achieved by moving the pin 308 out of a first section 310 of the enclosure 302, through the insert space 402, and into a second section 312 of the enclosure 302. A knob 314 is provided to allow a user to control said transitioning. The knob may be provided on a side surface of the enclosure 302 as shown in FIGS. 3-11 or alternatively on another surface (e.g., a top surface) of the enclosure as shown in FIG. 12. A mechanical mechanism (now shown in FIGS. 3-8) retains the pin 308 in its engaged state.

Figure 9:
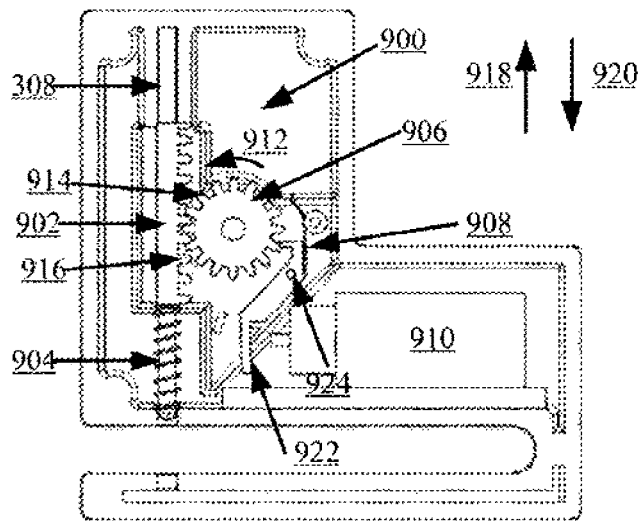
FIGS. 9-11 provide schematic illustrations that are useful for understanding operations of various mechanical components disposed within the security tag shown in FIGS. 3-8.
Figure 10:
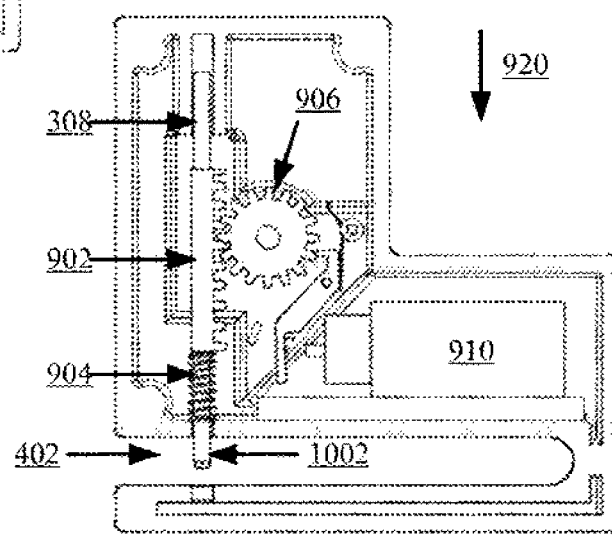
Figure 11:
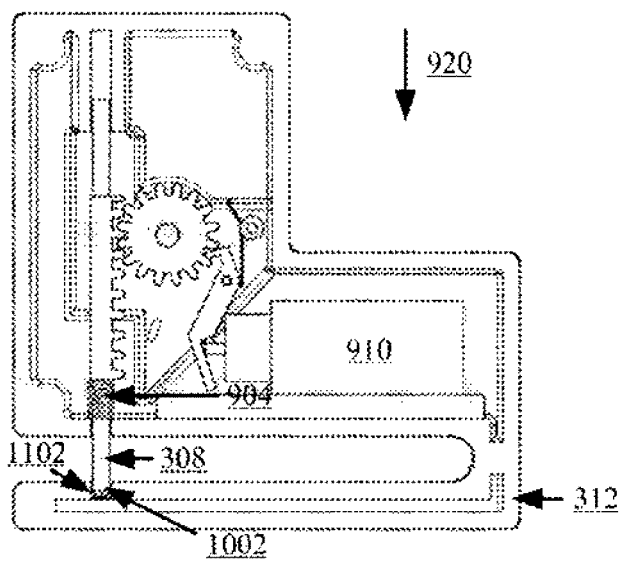
Figure 12:
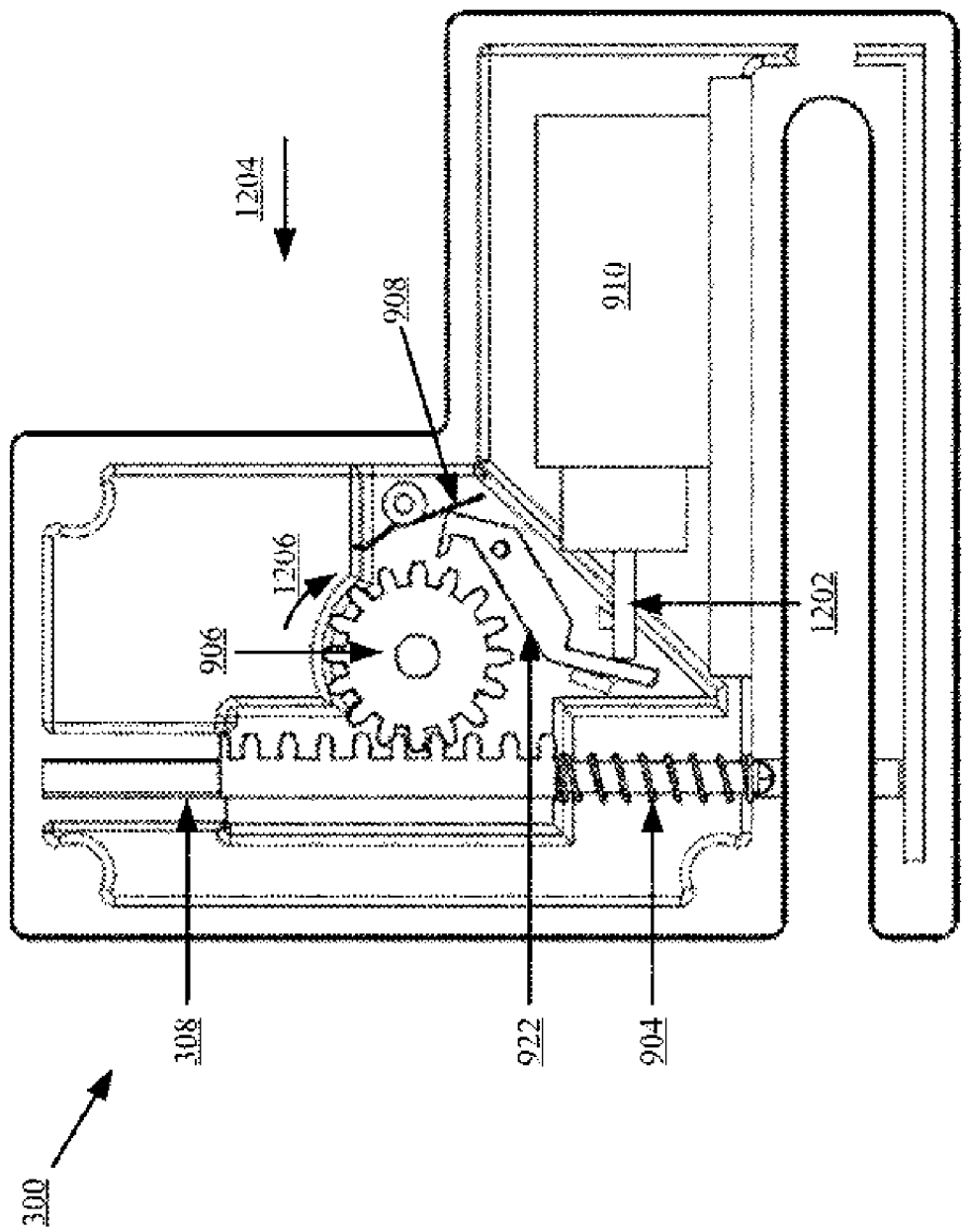
FIG. 12 is a schematic illustration that is an example for understanding how a pawl of a security tag is released.

Referring now to FIGS. 9-11, the internal components of the security tag 300 will be described. As noted above, an EAS/RFID element, NFC enabled device (e.g., NFC enabled device 136 of FIGS. 1-2) and/or electro-mechanical lock mechanism (e.g., electro-mechanical lock mechanism 216 of FIG. 2) are disposed within the security tag 300. The EAS/RFID element and NFC enabled device are not shown in FIGS. 9-11 exclusively for simplifying the schematic illustrations thereof.

As shown in FIG. 9, the electro-mechanical lock mechanism 900 of the security tag 300 comprises the pin 308, a linear actuator 902, 906, a spring 904, a leaf spring 908, a pawl 922 and an electric solenoid 910. The electro-mechanical lock mechanism 900 is not limited to these components. For example, the electric solenoid 910 may be replaced with a gear motor Electric solenoids and gear motors are well known in the art, and therefore will not be described herein. Any known or to be known electric solenoid and/or gear motor can be used herein without limitation, provided that the overall size thereof complies with the size requirements of the security tag 300.

The linear actuator comprises a pair of gears 902 and 906 which convert rotational motion of a circular gear 906 into linear motion of a linear gear 902. The circular gear 906 is referred to herein as a pinion gear, while the linear gear 902 is referred to herein as a rack gear. The knob 314 facilitates the user controlled rotational motion of the pinion gear 906. As such, the pinion gear 902 is coupled with the knob 314 such that it rotates therewith. For example, the pinion gear 902 rotates in the direction shown by arrow 912 as the knob 314 is rotated in said direction by a user.

The pinion gear 902 has a plurality of teeth 914 which engage a plurality of teeth 916 of the rack gear 902. Engagement of the teeth 914, 916 allows the rotational motion applied to the pinion gear 906 via the knob 314 to cause the rack gear 902 to move, thereby translating the rotational motion of the pinion gear 906 into the linear motion of the rack gear 902.

The rack gear 902 is securely coupled with the pin 308. Accordingly, linear motion of the rack gear 902 in direction 918 causes linear motion of the pin 308 in the same direction. Likewise, linear motion of the rack gear 902 in direction 920 causes linear motion of the pin 308 in the same direction. As the rack gear 902 moves in direction 920, the pin 308 transitions from its unengaged position shown in FIG. 9 to an intermediary position shown in FIG. 10.

In the intermediary position, an end 1002 of the pin 308 extends into the insert space 402. Also, the rack gear 902 applies a pushing force on the spring 904 which causes the compression thereof. In effect, the pin/gear arrangement is spring loaded, and is biased to return to the unengaged position when the pin 208 is in its intermediary position (as well as when in its fully engaged position).

Figure 13:
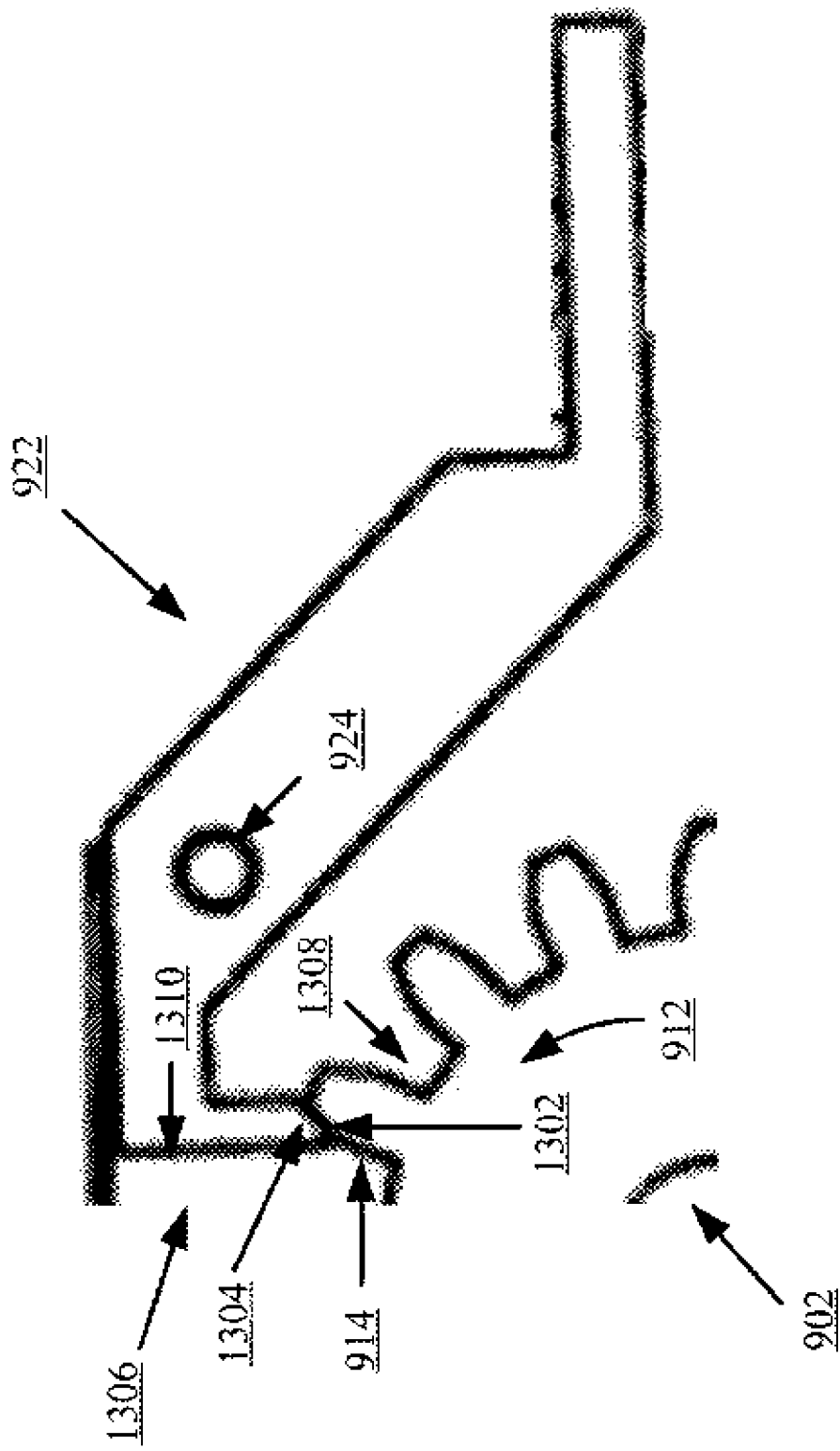
FIG. 13 is a top view of a pawl and a pinion gear.
Figure 14:
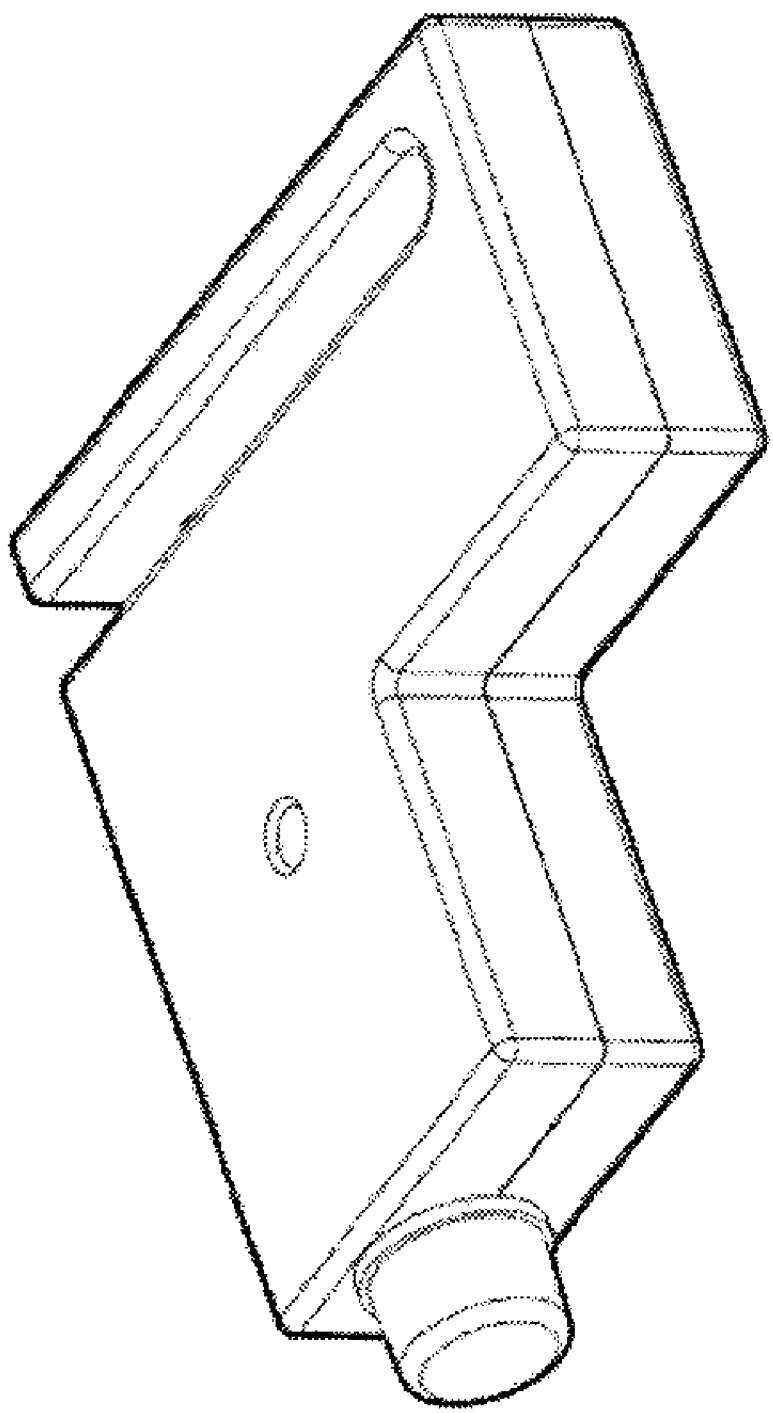
FIG. 14 is a perspective view of another exemplary security tag.

The pin 308 is retained in its intermediary position via the pawl 922. In this regard, the pawl 922 engages the pinion gear 902, and is pivotally coupled with the enclosure via a pivot member 924. A schematic illustration is provided in FIG. 13 which is useful for understanding the mechanical relationship between these components 902, 922. As shown in FIG. 13, the pawl comprises a protrusion 1306 that slidingly engages the teeth 914 of the pinion gear 902. The sliding engagement is facilitated by chamfered surface 1304 of protrusion 1306 and chamfered surfaces 1302 of teeth 914. As the pinion gear 902 rotates in direction 912, the chamfered surface 1304 slides along the exterior surface of the pinion gear 902 at least partially defined by the chamfered surfaces 1302 of teeth 914. In effect, the pawl's protrusion 1306 travels into and out of spaces 1308 existing between adjacent teeth 914 of the pinion gear 902. The leaf spring 908 facilitates the protrusion's traveling back into the spaces 1308.

When the protrusion 1306 resides in a space 1308, the pin 308 is retained in a given position since the pawl 922 prevents rotation of the pinion gear in a direction opposite direction 912. The prevention of the pinion gear rotation in the direction opposite direction 912 is at least partially facilitated by the straight surface 1310 of pawl 922 which engages the teeth 914 in a manner which does not allow the protrusion 1306 to travel into and out of spaces 1308 as a consequence of the pinion gear's traveling in the direction opposite direction 912.

Referring now to FIG. 11, there is provided a schematic illustration of the pin 308 in its fully engaged position. As shown in FIG. 11, the end 1002 of the pin 308 extends into an aperture 1102 formed in the second section 312 of the enclosure 302. Also, the spring 904 is in its fully compressed state. In effect, the pi/gear arrangement is spring loaded, and wants to return to the unengaged position. Thus, the pin is retracted back into the first section 310 of the enclosure 302 when the pawl 922 is released which results in the spring's automatic transition from its compressed state to its natural uncompressed state. During this transition, the rack gear 902 is able to freely travel in direction 918.

Referring now to FIG. 12, there is provided a schematic illustration that is useful for understanding how the pawl 922 is released. As noted above, detach operations of the security tag 300 are initiated via its reception of a wireless detach signal from an external device (e.g., PD 190, MCD 104 and/or the RTS 118 of FIG. 1) Upon said reception, the security tag 300 authenticates the detach command and activates the detaching mechanism, namely electric solenoid 910. The electric solenoid 910 is activated by supplying power thereto. The electric solenoid 910 drives post 1202 such that it moves in direction 1204 so as to apply a pushing force on the pawl 1204. The pushing force has a magnitude that is great enough to overcome a pushing force applied to the pawl 922 by leaf spring 908. The application of the pushing force by post 1202 causes the pawl 922 to transition from its engaged state shown in FIGS. 9-11 to its unengaged state shown in FIG. 12. In effect, the pinion gear 906 is able to move freely in direction 1206. Therefore, the pin 308 is able to be retracted from its engaged state as a result of the spring's 904 decompression Once the pin 308 has been fully retracted, the security tag 300 may be removed from an article (e.g., article 102 of FIG. 1) to which it is attached. In this scenario, a customer (e.g., customer 140 of FIG. 1) can carry the article through a surveillance zone without setting off an alarm.

Exemplary Methods for Operating a Security Tag

Usage of anti-theft tags prevents loss for retailers, but frequently adds a level of inconvenience to store cashiers and customers. Ideally anti-theft solutions should be secure while at the same time enhance customer experience. From the customer's point of view, the ideal solution would require very little time and technical knowledge. The following methods provide such an ideal solution.

Figure 15:
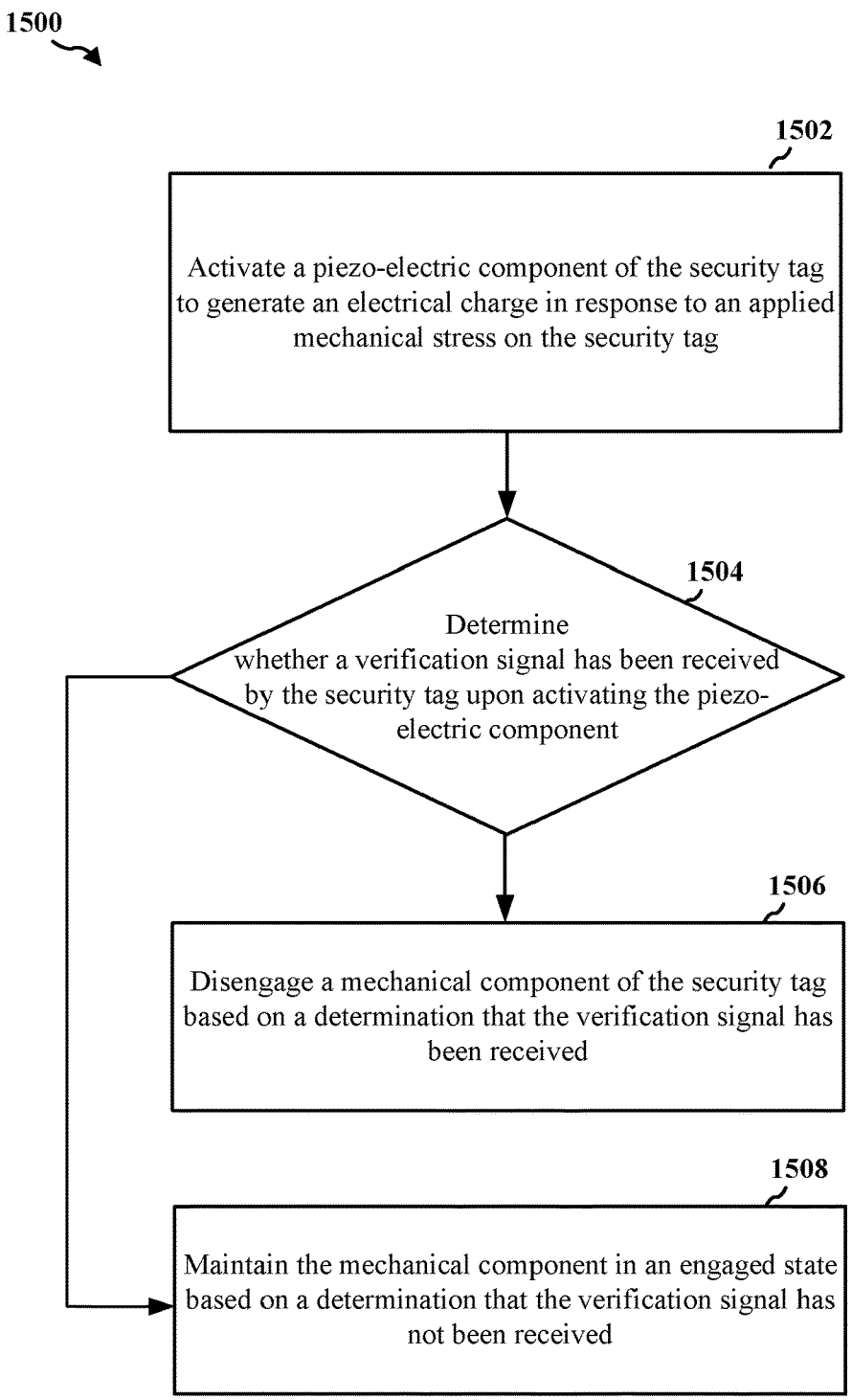
FIG. 15 is a flow chart of an exemplary method for operating a security tag.

Referring now to FIG. 15, there is provided a flow diagram of an exemplary method 1500 for operating a security tag. At step 1502, method 1500 includes activating a piezo-electric component 160 of the security tag to generate an electrical charge in response to an applied mechanical force on the security tag. For example, activating the piezo-electric component 160 further comprises to at least one of pressing a button, turning a dial, pulling a lever, and shaking motion. In an example, the piezo-electric component 160 lies in a dormant state without generating the electrical charge until activated.

Method 1500 may additionally include charging a capacitor 170 based on the electrical charge generated by activating the piezo-electric component 160 of the security tag.

Method 1500 may additionally include receiving, from a mobile device, a detach command to trigger performing of a tag detachment operation corresponding to disengaging the mechanical component, communicating with a network of a retail store facility to verify the detach command; and receiving the verification signal confirming completion of a sales transaction for an article being protected by the security tag.

At step 1504, method 1500 includes determining whether a verification signal has been received by the security tag upon activating the piezo-electric component. In an example, determining whether the verification signal has been received by the security tag further comprises determining whether the verification signal has been received by the security tag based on charging the capacitor 170. For example, the capacitor may power the communication component to detect signals and determine whether the verification signal has been received. In an example, the verification signal indicates completion of a sales transaction for an article being protected by the security tag.

At step 1506, method 1500 includes disengaging a mechanical component of the security tag 132 based on a determination that the verification signal has been received. In an example, disengaging the mechanical component further comprises retracting a pin to an unengaged position releasing an article being protected by the security tag based on the determination that the verification signal has been received. In an example, energizing one of a nano-muscle, solenoid, motor or linear actuator based on activating the piezo-electric component 160; and disengaging the mechanical component of the security tag 132 further comprises disengaging the mechanical component of the security tag 132 based on energizing one of the nano-muscle, solenoid, motor or linear actuator.

At step 1508, method 1500 includes maintaining the mechanical component in an engaged state based on a determination that the verification signal has not been received.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications Various presently unforeseen or unanticipated alternatives, modifications, variations or improvements may be made by those skilled in the art, each of which is also intended to be encompassed by the disclosed embodiments.

What is claimed is:

1. A method for operating a security tag, comprising:
   activating a piezo-electric component of the security tag to generate an electrical charge in response to an applied mechanical force on the security tag;
   determining whether a verification signal has been received by the security tag upon activating the piezo-electric component; and
   disengaging a mechanical component of the security tag based on a determination that the verification signal has been received.

2. The method of claim 1, wherein disengaging the mechanical component further comprises retracting a pin to an unengaged position releasing an article being protected by the security tag based on the determination that the verification signal has been received.

3. The method of claim 1, further comprising maintaining the mechanical component in an engaged state based on a determination that the verification signal has not been received.

4. The method of claim 1, further comprising charging a capacitor based on the electrical charge generated by activating the piezo-electric component of the security tag.

5. The method of claim 4, wherein determining whether the verification signal has been received by the security tag further comprises determining whether the verification signal has been received by the security tag based on charging the capacitor.

6. The method of claim 1, wherein the verification signal indicates completion of a sales transaction for an article being protected by the security tag.

7. The method of claim 1, further comprising:
   receiving, from a mobile device, a detach command to trigger performing of a tag detachment operation corresponding to disengaging the mechanical component;
   communicating with a network of a retail store facility to verify the detach command; and
   receiving the verification signal confirming completion of a sales transaction for an article being protected by the security tag.

8. The method of claim 1, wherein activating the piezo-electric component further comprises at least one of pressing a button, turning a dial, pulling a lever, and shaking motion.

9. The method of claim 1, further comprising:
   energizing one of a nano-muscle, solenoid, motor or linear actuator based on activating the piezo-electric component; and
   wherein disengaging the mechanical component of the security tag further comprises disengaging the mechanical component of the security tag based on energizing one of the nano-muscle, solenoid, motor or linear actuator.

10. The method of claim 1, wherein the piezo-electric component lies in a dormant state without generating the electrical charge until activated.

11. A security tag, comprising:
    a piezo-electric component that generates an electrical charge in response to being activated based on an applied mechanical force;

a communicating component that determines whether a verification signal has been received by the security tag upon activating the piezo-electric component; and a mechanical component that disengages the security tag based on a determination that the verification signal has been received.

12. The security tag of claim 11, wherein the mechanical component configured to disengage is further configured to retract a pin to an unengaged position releasing an article being protected by the security tag based on the determination that the verification signal has been received.

13. The security tag of claim 11, wherein the mechanical component maintains an engaged state based on a determination that the verification signal has not been received.

14. The security tag of claim 11, further comprising a capacitor that charges based on the electrical charge generated by activating the piezo-electric component of the security tag, wherein the communicating component configured to determine whether the verification signal has been received by the security tag is further configured to determine whether the verification signal has been received by the security tag based on charging the capacitor.

15. The security tag of claim 11, wherein the verification signal indicates completion of a sales transaction for an article being protected by the security tag.

16. The security tag of claim 11, wherein the communicating component is further configured to:

receive, from a mobile device, a detach command to trigger performing of a tag detachment operation corresponding to disengaging the mechanical component;

communicate with a network of a retail store facility to verify the detach command; and receive the verification signal confirming completion of a sales transaction for an article being protected by the security tag.

17. The security tag of claim 11, wherein activating the piezo-electric component further comprises at least one of pressing a button, turning a dial, pulling a lever, and shaking motion.

18. The security tag of claim 11, further comprising:

one of a nano-muscle, solenoid, motor or linear actuator that energize based on activating the piezo-electric component; and wherein the mechanical component is further configured to disengage the security tag based on energizing one of the nano-muscle, solenoid, motor or linear actuator.

19. The security tag of claim 11, wherein the piezo-electric component lies in a dormant state without generating the electrical charge until activated.

20. An electronic article surveillance (EAS) system, comprising:

a network device communicating a verification signal to a security tag attached to an article when a successful purchase of the article has been verified, where the verification signal includes a detach command for initiating a detachment of the security tag from the article; and the security tag comprising:

a piezo-electric component that generates an electrical charge in response to being activated based on an applied mechanical force;

a communicating component that determines whether a verification signal has been received by the security tag from the network device upon activating the piezo-electric component; and a mechanical component that is caused to be released in response to a reception of the wireless signal at the security tag.

* * * * *

UNITED STATES PATENT AND TRADEMARK OFFICE
CERTIFICATE OF CORRECTION

PATENT NO. : 11,263,882 B2
APPLICATION NO. : 16/894326
DATED : March 1, 2022
INVENTOR(S) : Edward Paul Ellers It is certified that error appears in the above-identified patent and that said Letters Patent is hereby corrected as shown below:

In the Specification

1. In Column 6, Line 19, delete "technology ("BLE")," and insert -- ("BLE") technology, --, therefor.
2. In Column 6, Line 41, delete "involve," and insert -- involve: --, therefor.
3. In Column 6, Line 59, delete "scenarios." and insert -- scenarios, --, therefor.
4. In Column 8, Line 2, delete "involve" and insert -- involve: --, therefor.
5. In Column 8, Line 6, delete "118," and insert -- 118; --, therefor.
6. In Column 11, Line 24, delete "motor" and insert -- motor. --, therefor.
7. In Column 12, Line 28, delete "pi/gear" and insert -- pin/gear --, therefor.
8. In Column 12, Line 40, delete "FIG. 1)" and insert -- FIG. 1). --, therefor.
9. In Column 12, Line 54, delete "decompression" and insert -- decompression. --, therefor.
10. In Column 13, Line 18, delete "component," and insert -- component; --, therefor.
11. In Column 13, Line 60, delete "invention" and insert -- invention. --, therefor.
12. In Column 14, Line 3, delete "applications" and insert -- applications. --, therefor.

Signed and Sealed this
Third Day of May, 2022

Katherine Kelly Vidal
*Director of the United States Patent and Trademark Office*